United States Patent [19]
Kleyer et al.

[11] Patent Number: 5,372,840
[45] Date of Patent: Dec. 13, 1994

[54] METHOD FOR ENHANCING DIELECTRIC STRENGTH OF CABLE USING FLUID HAVING A HIGH DIFFUSION COEFFICIENT

[75] Inventors: Don L. Kleyer, Hemlock; Wayne J. Chatterton, Midland; Maris J. Ziemelis, Midland; Gary A. Vincent, Midland, all of Mich.

[73] Assignee: Dow Corning Corporation, Midland, Mich.

[21] Appl. No.: 49,899

[22] Filed: Apr. 20, 1993

[51] Int. Cl.⁵ .............................................. B05D 1/00
[52] U.S. Cl. ................................. 427/117; 427/118; 427/140
[58] Field of Search ..................... 427/117, 118, 140

[56] References Cited

U.S. PATENT DOCUMENTS

| | | | |
|---|---|---|---|
| 3,252,834 | 5/1966 | Vincent | 427/117 |
| 4,299,713 | 11/1981 | Maringer | 174/110 SR |
| 4,332,957 | 6/1982 | Braus | 556/446 |
| 4,354,992 | 10/1982 | Bahder | 264/85 |
| 4,372,988 | 2/1983 | Bahder | 427/52 |
| 4,766,011 | 8/1988 | Vincent | 427/117 |
| 4,975,480 | 12/1990 | Bullen | 524/547 |
| 5,034,278 | 7/1991 | Turbett | 428/450 |
| 5,200,234 | 4/1993 | Bertini | 427/118 |

FOREIGN PATENT DOCUMENTS

| | | |
|---|---|---|
| 352793 | 7/1989 | European Pat. Off. . |
| 2210045 | 9/1987 | United Kingdom . |

*Primary Examiner*—Shrive Beck
*Assistant Examiner*—Vi Duong Dang
*Attorney, Agent, or Firm*—Alexander Weitz

[57] ABSTRACT

A method for enhancing the dielectric properties of a new or in-service electrical cable is disclosed, the method comprising supplying the interstitial void space of the cable's conductor with a water-reative antitreeing agent having a diffusion coefficient of at least $1 \times 10^{-7}$ cm²/second at 50° C. in the insulation of the cable and having an initial viscosity of $\leq 100$ cP at 25° C. The instant method provides a more symmetrical distribution of dielectric enhancing fluid in the insulation than prior art fluids and results in a significant reduction in cable treatment time.

9 Claims, 5 Drawing Sheets

METHOD FOR ENHANCING DIELECTRIC STRENGTH OF CABLE USING FLUID HAVING A HIGH DIFFUSION COEFFICIENT

FIELD OF THE INVENTION

The present invention relates to a method for the enhancement of the dielectric strenth of an electrical distribution cable. More particularly, the instant invention relates to a method of contacting the interior of the cable with a water-reactive antitreeing agent having a diffusion coefficient of at least $1\times 10^{-7}$ cm$^2$/second at 50° C. in the polymeric insulation of the cable.

BACKGROUND OF THE INVENTION

A major problem associated with electrical distribution cable is its tendency, over a period of time, to fail due to the progressive degradation of its insulation. The degradative processes involved in the failure of cables are correlated with two "treeing" phenomena. "Electrical treeing" is the product of numerous electrical discharges in the presence of strong electrical fields which eventually lead to the formation of channels within the insulation material. These channels resemble the trunk and branches of a tree in profile under microscopic observation, from which the descriptive terminology derives.

The second type of treeing, known as "water treeing," is observed when the insulation material is simultaneously exposed to moisture and an electric field. This mechanism is much more gradual than electrical treeing, requiring an extended period of time to cause the degree of damage that affects the insulation characteristics of the distribution cable. However, since water treeing occurs at considerably lower electrical fields than required for the formation of electrical trees, this phenomenon is thought to be a leading cause of reduced service life of cables.

It is known that water treeing can be arrested to a degree by the incorporation of an anti-tree additive (e.g., various organosilanes) directly into the insulation composition of the cable at time of manufacture. Unfortunately, this approach only addresses the issue of how to inhibit the formation of trees and the associated deterioration of insulation integrity. It will, however, be recognized that a vast network of underground cable is already in place wherein the cable either has not been treated according to one of these procedures or it has degenerated significantly despite such efforts and is therefore subject to premature failure.

As a partial answer to industry's desire to extend the useful life of existing underground cables, it has been found that certain tree retardants can be introduced into the cable's interior to partially restore the insulation performance. An example of such a cable reclamation technique is found in U.S. Pat. No. 4,372,988 to Bahder. This patent teaches a method for reclaiming electrical distribution cable which comprises: purging the cable with a desiccant gas; then supplying, in a continuous fashion, a liquid, such as polydimethylsiloxane fluid, to the interior of the cable. This disclosure suffers from the disadvantage that the fluid can exude or leak from the cable. This reference addresses the potential loss of fluid by providing reservoirs which can maintain a constant fluid level, further adding to the complexity of this system. A similar method was proposed by Vincent et al. in U.S. Pat. No. 4,766,011, wherein the tree retardant fluid was selected from a particular class of aromatic alkoxysilanes. Again, the tree retardant fluid was supplied to the interstices of the conductor of the cable. However, fluid of this prior art disclosure could be polymerized within the water tree voids in the insulation and therefore would either not leak out of the cable or would only exude therefrom at a low rate.

As a variation on the method of Vincent et al., U.S. Pat. No. 5,200,234 to Bertini, assigned to the assignee of the present invention, discloses a method for the restoration of in-service electrical cable, which is positioned within a surrounding conduit, comprising filling the space between the cable and the conduit with a homogeneous mixture of a silane antitreeing agent and a dielectric oil, said dielectric oil being completely miscible with said antitreeing agent and having a solubility in the polymeric insulation of the cable of less than 5 weight percent.

The cable reclamation method disclosed by Vincent et al. is effective but typically requires a long exposure time to obtain a fully treated cable. As a consequence, a contractor might find it economically equivalent, or even advantageous, to completely replace a cable once it has deteriorated rather than avail himself of this restorative method.

SUMMARY OF THE INVENTION

Applicants have extensively investigated the method taught by Vincent et al. and have discovered that this method is limited by a heretofore undisclosed phenomenon whereby the use of the suggested fluids results in a highly asymmetric treatment of the cable insulation. This asymmetry, which is further described infra, has been correlated to a lower level of dielectric breakdown strength of the treated cable. Due in part to the discovery of this asymmetry, the inventors of the instant application now teach those skilled in the art a method which overcomes this disadvantage and results in a much more symmetrical distribution of a dielectric enhancing fluid in the treated cable insulation. Moreover, the instant method results in a significant reduction in cable treatment time over the method described by Vincent et al.

The instant invention therefore relates to a method for enhancing the dielectric properties of an electrical cable having a central stranded conductor encased in a polymeric insulation, the cable having an interstitial void space in the region of the conductor, the method comprising supplying the interstitial void space of the cable with a water-reactive antitreeing agent which has a diffusion coefficient of at least $1\times 10^{-7}$ cm$^2$/second at 50° C. in the insulation polymer and an initial viscosity of $\leq 100$ cP at 25° C.

DETAILED DESCRIPTION OF THE INVENTION

For the purposes of the invention, the in-service cable is generally of the type used in underground residential distribution and typically comprises a central core of a stranded copper or aluminum conductor encased in polymeric insulation. As is well known in the art, there is usually also a semi-conducting polymeric conductor shield positioned between the conductor and insulation as well as a semi-conducting insulation shield covering the insulation, the latter being ordinarily wrapped with a wire or metal foil grounding strip and, optionally, encased in an outer polymeric protective jacket. The insulation is preferably a polyolefin polymer, such as polyethylene or a copolymer of polyethylene and propylene, or vinyl acetate. As used herein, the term "in-service" refers to a cable which has been under electrical load and exposed to the elements for an extended period. In such a cable, the electrical integrity of the cable insulation has generally deteriorated to some extent due to the formation of water trees, as described above. It is also contemplated, however, that the instant method can be used to enhance the dielectric properties of a new cable as well as an in-service cable.

After the cable has been in operation for an extended period, for example 7 to 15 years, the dielectric enhancing fluid of the invention is introduced into the interstitial void space of the conductor. Alternatively, a representative section of cable can be removed and subjected to dielectric breakdown tests to determine whether a particular installation is a good candidate for the method of the invention.

The method of the present invention is carried out in the manner described in above cited U.S. Pat. No. 4,766,011 to Vincent et al., assigned to the assignee of the present invention. This patent is hereby incorporated by reference to teach dielectric enhancement of a cable by supplying the interstitial void space thereof with an antitreeing fluid. Briefly, the method comprises filling the interstitial void space of the conductor with the dielectric enhancing fluid, described infra, according to well known methods. The fluid is allowed to remain in the cable interior for an appropriate period while it diffuses into the cable's polymeric insulation to fill the water trees, thereby enhancing the dielectrical strength of the cable. The time required for the treatment is a function of such variables as cable size (insulation thickness), water content of the cable components and treatment temperature, less time being required when the cable is thinner and operates at higher current loads. Those skilled in the art will readily determine optimum conditions for a particular situation based on the following disclosure and routine experimentation. As is also known in the art, the instant method may further comprise a step wherein water present in the conductor interstitial volume may be removed or its quantity reduced prior to the introduction of the dielectric enhancing fluid. In this operation, a desiccant gas or liquid, such as air, nitrogen, ethanol or isopropanol, is flushed through the cable interior to either physically push out the moisture or to mix with the water to facilitate physical removal. Thus, for example, a high velocity dry air stream may be used to blow out bulk water which has accumulated in the void space.

As already noted, the practice of the above described method using a fluid according to the previously cited patent to Vincent et al. (e.g., phenylmethyldimethoxysilane), results in an asymmetric distribution of the fluid in the cable's insulation. This asymmetry manifests itself as an irregularly shaped penetration front of the fluid in the insulation cross-section when the cable is cut perpendicular to its longitudinal axis. As used herein, the term "penetration front" is defined as the boundary between untreated polymer and polymer into which at least some fluid has diffused. This asymmetry can be observed visually as a general lightening of the polymer into which the fluid has penetrated. Alternatively, an accurate determination of the penetration front can be made by an infrared micro mapping technique, described infra. Thus, during the early phases of treatment with such a fluid, there can be little or no penetration along a given radial direction. These areas represent weak links in the treatment where dielectric breakdown is more likely to occur than in those areas which have been more extensively penetrated by the dielectric enhancing fluid. Given sufficient treatment time, the fluid would presumably diffuse into all of the insulation, but it is clearly advantageous to have as symmetric a distribution of the dielectric enhancing fluid as possible throughout the treatment process.

Although the inventors of the instant method do not wish to be bound by a particular theory or mechanism, it is believed that the observed asymmetry is related to the compaction of conductor strands during cable manufacture. Thus, when a typical cable is fabricated, its conductor strands are subjected to uneven pressures as the conductor travels between multiple sets of rollers before the shield and insulation are extruded thereover. This can result in significant compaction of some strands such that little fluid can penetrate the strands in this region. On the other hand, where little or no such compaction occurs, the strands form a relatively loose structure and diffusion into the insulation is not impeded. Further compounding this problem, water, which has been absorbed in the narrow regions between conductor strands within the conductor shield, can also retard the penetration of dielectric enhancing fluid.

The above described asymmetry can be greatly reduced or eliminated by employing a fluid comprising a water-reactive antitreeing agent having a diffusion coefficient of at least $1 \times 10^{-7}$ cm$^2$/second at 50° C. in the polymeric insulation of the cable. Since the fluid must flow through the relatively small cross-sectional area of the cable's interstitial void space, the initial viscosity of this fluid should be no greater than about 100 cP at 25° C., preferably less than about 20 cP at 25° C. When the viscosity is greater, filling the cable with the fluid is difficult and/or too time consuming. Further, the skilled artisan will readily appreciate that the dielectric enhancing fluid must be completely compatible with the materials of construction of the cable. This applies equally to any reaction products it may form with adventitious water. Thus, for example, the fluid must be compatible with both aluminum and copper conductors, must not cause excessive swelling of either the conductor or insulation shields or interact in any untoward manner with the polymeric insulation. It is preferred that the dielectric enhancing fluid have a vapor pressure below about 30 psi (207 kPa) at the operating temperature of the conductor, which can be as high as 130° C. under emergency conditions, but generally is no more than 90° C.

The dielectric enhancing fluid of the present invention is a water-reactive antitreeing agent which is known to prevent water trees in polymeric insulation when compounded therein, with the proviso that the diffusion coefficient is at least $1 \times 10^{-7}$ cm2/second at 50° C. in the polymeric insulation of the cable. The restorative fluid must also be capable of reacting with water to polymerize in the cable insulation after diffusing therethrough. This tends to increase the lifetime of the treatment and precludes the need for perpetual maintenance of the dielectric enhancing fluid. The antitreeing agent may be selected from trialkylalkoxysilanes, dialkyldialkoxysilanes or organoborates. The antitreeing agent can also be an orthoester having the general structure $R^1C(OCH_3)_3$, where $R^1$ is selected from hydrogen or a methyl radical. Alternatively, the antitreeing agent can be an enol ether of the general structure $R^3R^4C=C(OR^5)R^6$, where $R^3$, $R^4$ and $R^6$ are independently selected from hydrogen or alkyl radicals having 1 to 3 carbon atoms and $R^5$ is $-SiR^7_3$, in which $R^7$ is an alkyl radical having 1 to 2 carbon atoms. When the above fluids are allowed to diffuse into polymeric insulation materials, such as polyethylene, it has been found that tree formation in the treated materials is retarded relative to a control or when the fluid does not react with water. Specific examples of suitable water reactive compounds and their respective diffusion coefficients (D) at 50° C. in low density polyethylene (wherein Me denotes a methyl radical and OAc denotes an acetoxy group), include:

$Me_3Si(OMe)$ (D = $2.4 \times 10^{-7}$)
$(MeO)_3CH$ (D = $1.7 \times 10^{-7}$)
$(MeO)_3CCH_3$ (D = $1.0 \times 10^{-7}$)
$(MeO)_3B$ (D = $2.7 \times 10^{-7}$)
$Me_2Si(OMe)_2$ (D = $1.4 \times 10^{-7}$)
$CH_2=C(Me)-OSiOMe_3$ (D = $1.5 \times 10^{-7}$)

When the dielectric enhancing fluid is a compound which can form oligomers upon reaction with water, it is preferred that this compound have a low water equivalent weight, this being defined as the weight of the compound required to react with one mole of water. This preference is suggested by the observation that the oligomers have significantly lower diffusion coefficients relative to the monomer and the intent is to limit the extent of oligomerization in the conductor region so that more of the fluid can penetrate the insulation as quickly as possible and react with the water therein.

EXAMPLES

The following examples are presented to further illustrate the method of this invention, but are not to be construed as limiting the invention, which is delineated in the appended claims. All parts and percentages in the examples are on a weight basis and all measurements were obtained at 25° C., unless indicated to the contrary.

Example 1

A cable of the following construction was used in the evaluation of various fluids shown in Table 1: 1/0 AWG stranded aluminum conductor (single strand diameter 0.19 cm), extruded semiconducting conductor shield, 175 mils crosslinked polyethylene insulation, extruded semiconducting insulation shield and tinned copper concentric neutral strips. This cable was rated at 15 kV (8.7 kV to ground) and had been aged for 3.5 years while submerged in ambient temperature water. During this aging procedure, the cable was energized at 20 kV to ground (60 Hz AC) and water was also added to the conductor region to further accelerate the aging process.

The aged cable was cut into 90 foot long sections and each such section was treated with one of the liquids shown in Table 1 according to the following procedure, one untreated section serving as a control. In each case, 0.2 weight percent of a tetraisopropyl titanate catalyst was added to the fluid. Herein, the following notation is used to represent moieties of the chemical structures: Ph=phenyl radical; Me=methyl radical; Et=ethyl radical; Vi=vinyl; and AcO=acetoxy group.

TABLE 1

| Fluids Used in Example 1 | |
|---|---|
| Fluid | Chemical Structure |
| 3 | $MeOSi(Me)_2-CH_2CH_2-C\begin{smallmatrix}CH-CH\\\\CH=CH\end{smallmatrix}C-CH_2CH_2-Si(Me)_2OMe$ |
| 5 | $(Ph)_2-Si(OMe)_2$ |
| 6 | $ViSi(Me)(OEt)_2$ |
| 7 | $AcO(-CH_2CH_2O)_4-CH_2CH_2CH_2-Si(Me)(OMe)_2$ |
| 10 | $NC-CH_2CH_2-Si(OEt)_3$ |
| 13 | $CH_2\underset{O}{\overset{}{\diagdown\diagup}}CH_2CH_2-O-CH_2CH_2CH_2-Si(OMe)_3$ |
| 14 | $Ph-CH=N-CH_2CH_2CH_2-Si(OEt)_3$ |
| 15 | $Ph-Si(Me)(OMe)_2$ |
| 16 | $Ph-C(O)Me$ |
| 17 | $CH_2=C(Me)C(O)-OCH_2CH_2CH_2-Si(OMe)_3$ |
| 18 | $CH_2=C(Me)C(O)N(Me)-CH_2CH_2CH_2-Si(OMe)_3$ |
| 19 | $Me_2Si(OMe)_2$ |
| 20 | $F_3CCH_2CH_2Si(Me)(OMe)_2$ |
| 21 | $HO(PhMeSiO)_xH$ where x = 2 to 5 |
| 23 | $Me_3SiO(Me_2SiO)_2Me_3$ |

First the interstitial space of the conductor was flushed with isopropanol to remove liquid water therefrom. A volume of the isopropanol equivalent to two interstitial volumes was so employed, one such interstitial volume being allowed to remain in the cable conductor for about 20 hours. A fluid was then injected into the conductor interstitial space. Again, twice the interstitial volume of fluid was used to flush out the isopropanol. The final fluid treatment was then introduced to the interstitial space and maintained therein by reservoirs at each end of the cable section, which reservoirs were pressurized using a helium blanket at 12 psi (83 kPa) gauge pressure. This condition was maintained for the first 60 days of treatment, after which the reservoirs were drained of fluid and blanketed with helium at essentially atmospheric pressure. After filling the cable interstices with a fluid, the cable was again energized at 20 kV to ground (60 Hz AC) and submersed in ambient temperature water for six months.

At the end of six months, each cable section was cut into five equal test lengths and each length was subjected to alternating current (60 Hz) dielectric breakdown tests. The breakdown tests were performed by increasing the applied voltage in ten percent increments every five minutes until the insulation failed. The results of these tests are presented in Table 2, wherein the statistically calculated breakdown strength is given at 13, 50 and 87% probability, respectively, based on a Weibull distribution.

TABLE 2

Breakdown Stress at 13, 50 and 87% Probability

| Fluid | Breakdown Stress (Volts/mil) (13, 50, 87% probability) |
|---|---|
| Untreated Control | 440, 516, 570 |
| 3 | 635, 966, 1045 |
| 5 | 620, 921, 1085 |
| 6 | 980, 1095, 1185 |
| 7 | 680, 777, 990 |
| 10 | 620, 1042, 1370 |
| 13 | 540, 773, 980 |
| 14 | 400, 738, 980 |
| 15 | 970, 1117, 1170 |
| 16 | 880, 1015, 1210 |
| 17 | 460, 929, 1240 |
| 18 | 550, 725, 975 |
| 19 | 915, 1133, 1320 |
| 20 | 690, 838, 1160 |
| 21 | 465, 509, 560 |
| 23 | 450, 473, 500 |

In separate experiments, the diffusion coefficient of each fluid of Table 1 was measured at various temperatures in polyethylene. Representative data at 50° C. is shown in Table 3, wherein powers of 10 are written in engineering form such that, for example, 3.6e-8 denotes $3.6 \times 10^{-8}$. This table also shows the Arrhenius parameters which can be used to calculate the diffusion coefficient D in the approximate temperature interval of 20° to 70° C. according to the equation:

$$D = A \, 10^{-Q/T}$$

where (A) is the pre-exponential factor, also shown in Table 3, and T is the temperature in degrees Kelvin.

TABLE 3

Diffusion Coefficient (D) at 50° C. and Arrhenius Factors (A) and (K) for Diffusion of Fluids in Polyethylene.

| Fluid | D (cm²/sec) | Q (K) | A (cm²/sec) |
|---|---|---|---|
| 3 | 9.4e-9 | 4004 | 2.137e4 |
| 5 | 1.6e-8 | 3742 | 4.391e3 |
| 6 | 7.7e-8 | 3676 | 1.744e4 |
| 7 | 1.1e-8 | — | — |
| 10 | 1.2e-8 | 4416 | 6.431e5 |
| 14 | 7.6e-9 | 4517 | 7.174e5 |
| 15 | 5.9e-8 | 3539 | 5.129e3 |
| 16 | 1.3e-7 | 5380 | 3.215e9 |
| 17 | 2.2e-8 | 4027 | 6.564e4 |
| 18 | 8.0e-8 | 5252 | 1.460e8 |
| 19 | 1.4e-7 | 3607 | 1.998e4 |
| 20 | 4.0e-8 | 3498 | 3.254e3 |
| 21 | 5.2e-8 | 2204 | 3.473e-1 |
| 23 | 7.3e-9 | 3407 | 3.671e2 |

Figure 1:
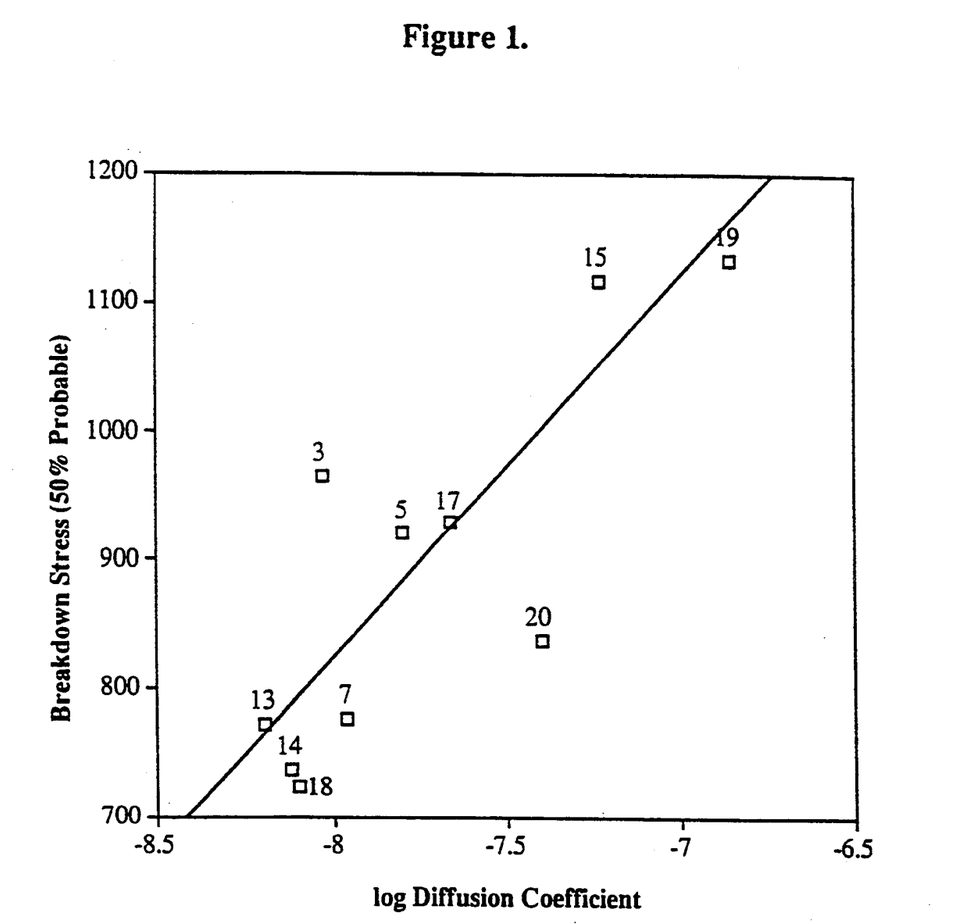
FIG. 1 is a graph showing the (50% probability) dielectric breakdown of treated cables as a function of the (log) diffusion coefficient of the treating fluid at 50° C.

The breakdown data at 50% probability (from Table 2) is plotted as a function of the logarithm of the diffusion coefficient (from Table 3) for the various fluids in FIG. 1. All the fluids which do not react with water have been omitted from this plot since these were shown to be inferior with respect to retarding tree formation, as described infra. Fluids 6 and 10 were also excluded from FIG. 1 since it was observed that they interacted with the aluminum conductor to form a gas within the conductor region; these fluids could therefore not be used in the instant method. The data of FIG. 1 were used to obtain the least squares linear equation relating the variables:

$$50\% \text{ Breakdown Stress} = 253.9 (\log D) + 2{,}871$$

wherein D is the diffusion coefficient and the calculated correlation coefficient (r) is 0.73. From FIG. 1 it can be seen that there is a good correspondence between diffusion coefficient of water-reactive fluids and ability to enhance the dielectric strength of the aged cable.

Example 2

Water trees were grown in polyethylene specimens having defects of known dimension as points of initiation. Each polyethylene sample was molded in the shape of a short-walled cup having a 6 mm thick flat bottom. This cup had a diameter of 70 mm and a wall having a height of 16 mm for the purpose of retaining a liquid electrolyte. Simulated defects were created on the inside surface of the cup's bottom by penetrating the surface with a special needle to a depth of 3.2 mm and subsequently withdrawing the needle. The needle had a diameter of 1 mm (+0, −0.03 mm), a of tip angle of 30° and a tip radius of 3±1 micrometers. A total of 16 such defects per specimen were created (arranged in a square pattern) in order to provide a basis for statistical analysis.

Each cup containing the simulated defects was treated with one of the fluids shown in Table 4 by total immersion for 7 days at 50° C. Each cup was then partially filled with a saturated aqueous solution of NaCl electrolyte and immersed in a glass dish which also contained some of this electrolyte, the two electrolyte portions being insulated from each other by the wall of the polyethylene cup. A potential of 5,000 volt AC, 3000 Hz, was imposed between the electrolyte in the cup and the electrolyte in the glass dish, the latter being maintained at ground potential.

After a period of 100 hours at room temperature, the defect area was microtomed and stained with methylene blue dye to reveal the resulting trees, the lengths of which were then measured by optical microscopy. The results are presented in Table 4, wherein the standard deviation of tree length is also given.

TABLE 4

| Treatment Fluid | Average Tree Length (Micrometers) | Standard Deviation |
|---|---|---|
| None (Control) | 242 | 30.6 |
| Dodecanol | 85.8 | 12.3 |
| Acetophenone | 92.8 | 20.8 |
| HO(PhMeSiO)$_x$H (x = 2-5) | 233.1 | 43.2 |
| HO(Me$_2$SiO)$_x$H (x = 2-5) | 199 | 48.5 |
| PhSi(Me)(OMe)$_2$ | 20.7 | 6.8 |
| Me$_2$Si(OMe)$_2$ | 21.4 | 11.8 |
| (MeO)$_3$CCH$_3$ | 56.2 | 12.4 |
| 70% PhSi(Me)(OMe)$_2$/ 30% Me$_2$Si(OMe)$_2$ | 13.7 | 5.9 |
| 70% PhSi(Me)(OMe)$_2$/ 30% Me$_3$Si(OMe) | 26.7 | 8.5 |

From Table 4, it can be seen that, while fluids which do not react with water, such as acetophenone, the hydroxy-terminated siloxanes and dodecanol, can retard tree formation relative to an untreated control, their performance is significantly inferior to that obtained from the water reactive materials.

Example 3

A 750 kcmil (15 kV rated) crosslinked polyethylene-insulated cable which had been aged under actual field conditions for more than 20 years was removed from service and cut into segments. Each segment was treated by injecting a dielectric enhancing fluid into the interstitial volume of the conductor and maintaining the fluid therein for 20 days at a gauge pressure of 10 psig (69 kPa) and at a temperature of 50° C. The fluids used were:

(a) phenylmethyldimethoxysilane, the preferred fluid of the patent to Vincent et al., cited supra; and
(b) dimethyldimethoxysilane To each of these fluids, there was added 0.2 weight percent of tetra-isopropyl titanate (TIPT) catalyst just before treating the cable segments.

When the above treatments were completed the cable segments were identically sectioned in a transverse direction and the extent of penetration of the respective fluid in the insulation was determined by micro infrared mapping analysis. According to this procedure, the cable insulation was scanned in a radial direction by microtoming sections thereof perpendicular to the length of the cable and using a Fourier Transform Infrared (FTIR) microscope to determine absorbance at 1260 cm$^{-1}$. This absorption is due exclusively to the stretching deformation of methyl radicals on silicon in the silane and is therefore related to the silane concentration at a given point in the insulation. Twelve such radial scans were made on each cable section (i.e., at 30° increments about the circumference). In each case, the radial distance at which the treating fluid was no longer detected was recorded, these points defining the fluid's penetration front. This data is presented in Table 5, wherein the outer radius of the cable insulation was about 17,969 micrometers and the inner radius of the insulation was about 13,589 micrometers.

TABLE 5

| Angle of Scan (degrees) | Penetration of Fluid in Insulation (micrometers) | |
| --- | --- | --- |
| | Fluid (a) | Fluid (b) |
| 0 | 14094 | 17969 |
| 30 | 15664 | 17969 |
| 60 | 13939 | 17814 |
| 900 | 17969 | 17969 |
| 120 | 16574 | 17969 |
| 150 | 15799 | 17814 |
| 180 | 13589 | 16729 |
| 210 | 13939 | 17194 |
| 240 | 13589 | 17814 |
| 270 | 14404 | 17814 |
| 300 | 14404 | 17969 |
| 330 | 14559 | 17969 |

Figure 2:
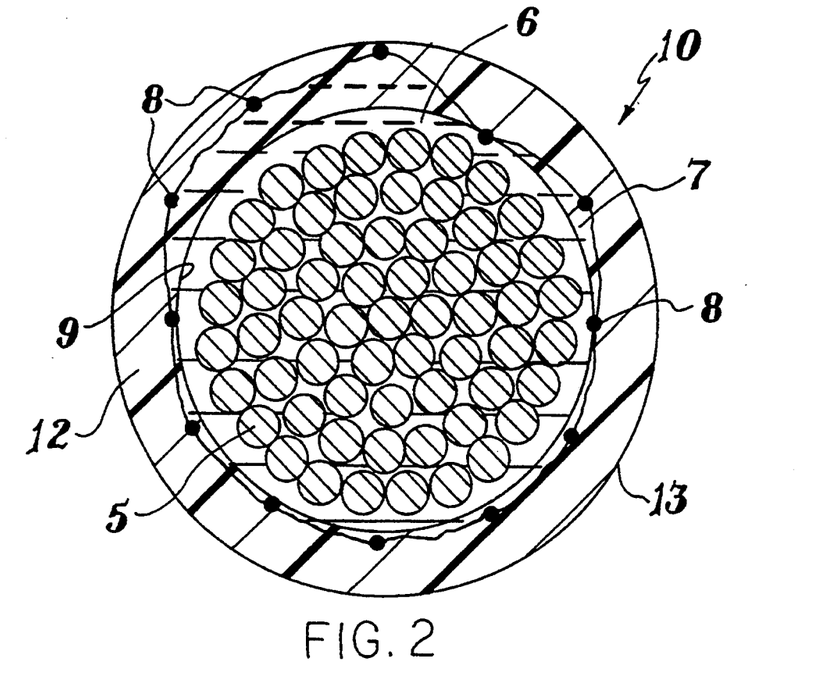
FIG. 2 is a cross-section of a cable treated with phenylmethyldimethoxysilane.
Figure 3:
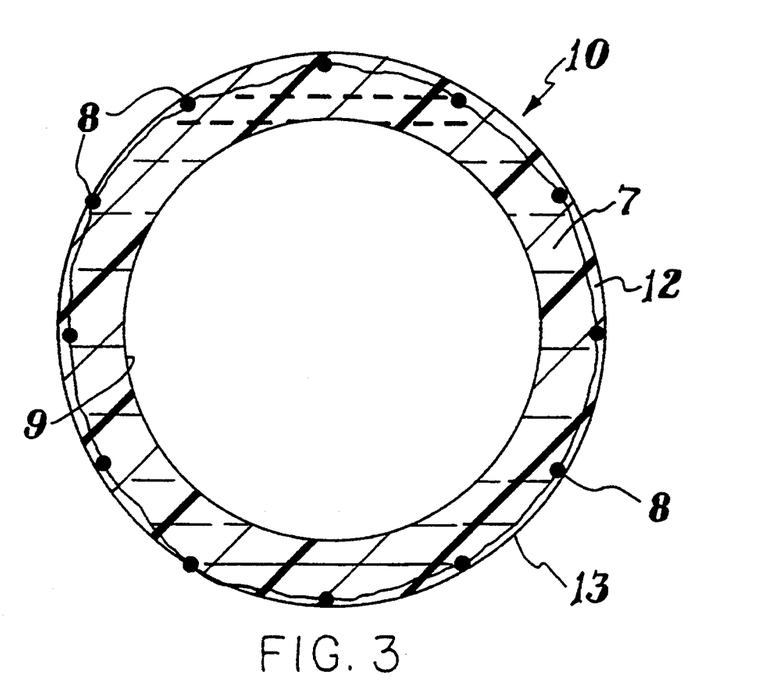
FIG. 3 is a cross-section of a cable treated with dimethyldimethoxysilane.

FIG. 2 shows the cross-section of the above described cable and illustrates the diffusion of fluid (a) into the polyethylene insulation thereof. This figure illustrates the cable (10) which comprises a conductor consisting of 61 individual strands (5) of 10 gauge aluminum, a conductor shield (6) covering the conductor and insulation (12) covering the conductor shield, said insulation having an inner surface (9) and an outer surface (13). In this figure, the extent of fluid penetration, as presented in Table 5, is indicated by the circled points (8). The line connecting points (8) represents the penetration front, region (7) illustrating the portion of insulation (12) into which the dielectric enhancing fluid has diffused. In a similar manner, FIG. 3 shows the penetration profile for above described fluid (b). In these latter figure, the conductor and conductor shields have been omitted for the sake of simplicity.

From FIG. 2 and Table 5, it can be seen that the penetration front of fluid (a) had a highly asymmetric pattern. Indeed, this fluid was not even detected in at least two of the radial scans. Such areas of little or no penetration represent weak links in the insulation integrity where breakdown is likely to occur in the energized cable. To the contrary, FIG. 3 indicates that the cable treated according to the method of the present invention using fluid (b) under identical conditions had a much more symmetrical penetration front. In this case, all radial directions showed nearly complete penetration of the insulation by the treating fluid.

Example 4

Figure 4:
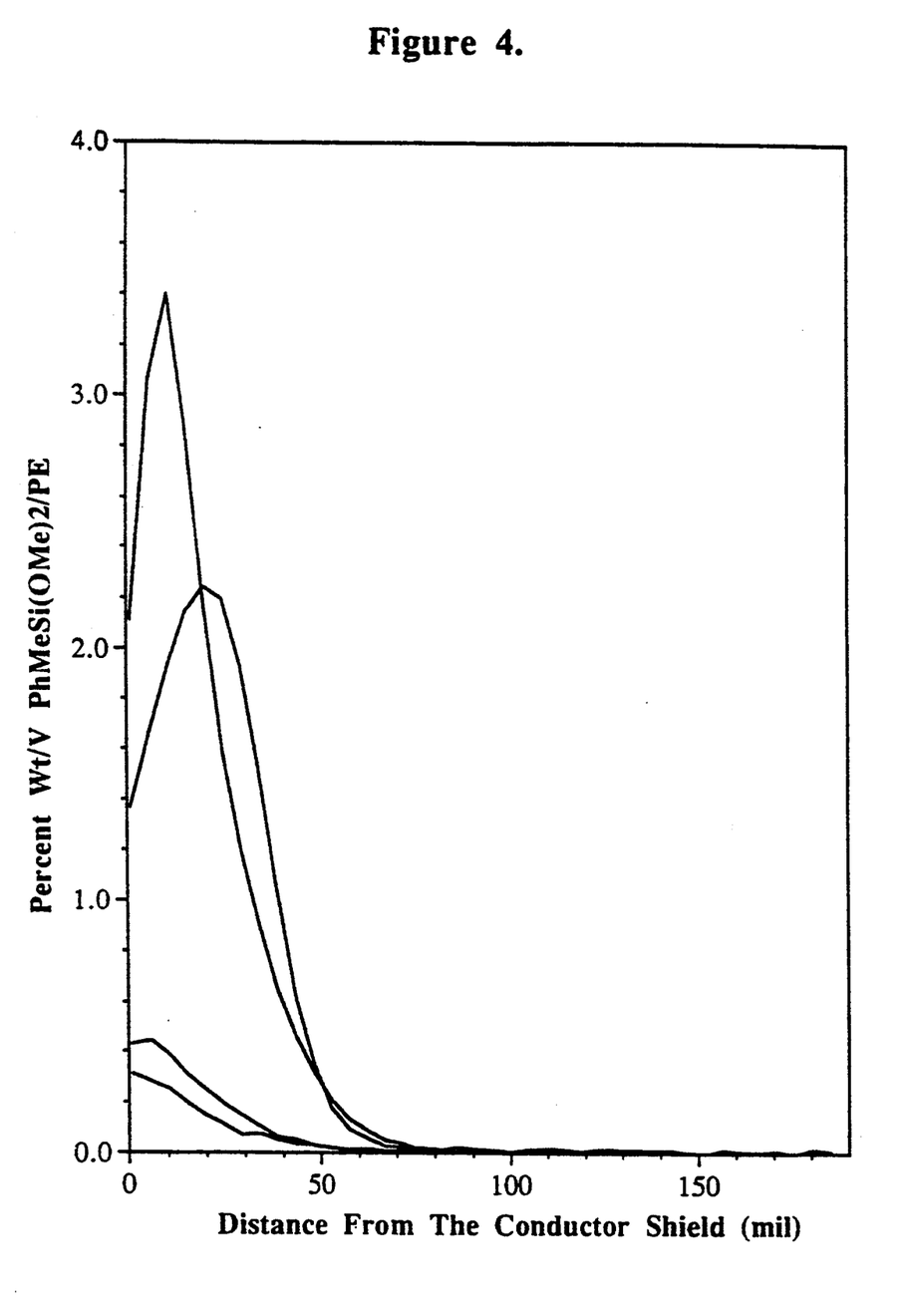
FIG. 4 is a plot of the concentration of phenylmethyldimethoxysilane in the insulation of phase 1 of a treated feeder cable as a function of distance from the conductor shield.
Figure 5:
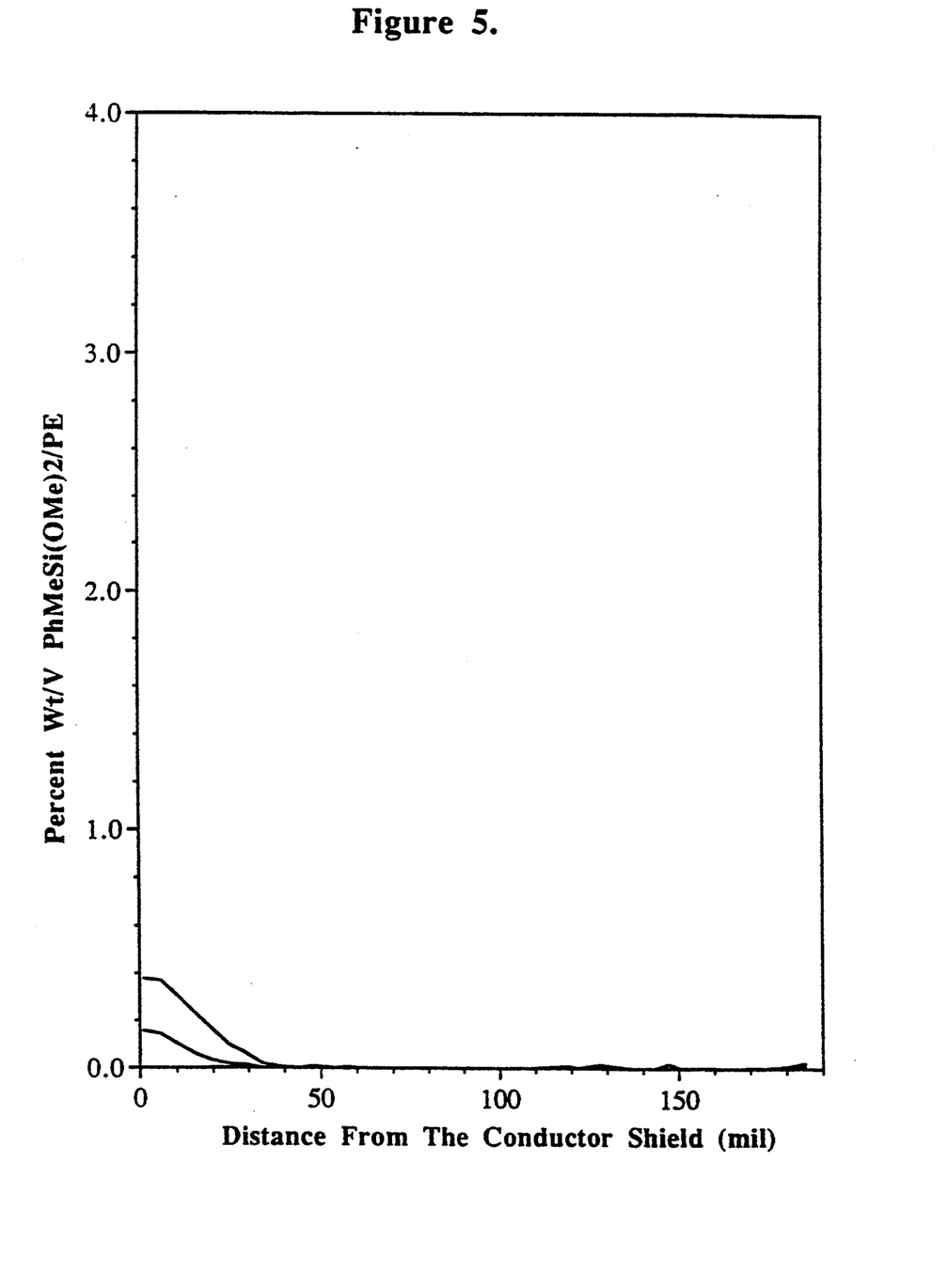
FIG. 5 is a plot of the concentration of phenylmethyldimethoxysilane in the insulation of phase 2 of the treated feeder cable of FIG. 4 as a function of distance from the conductor shield.
Figure 6:
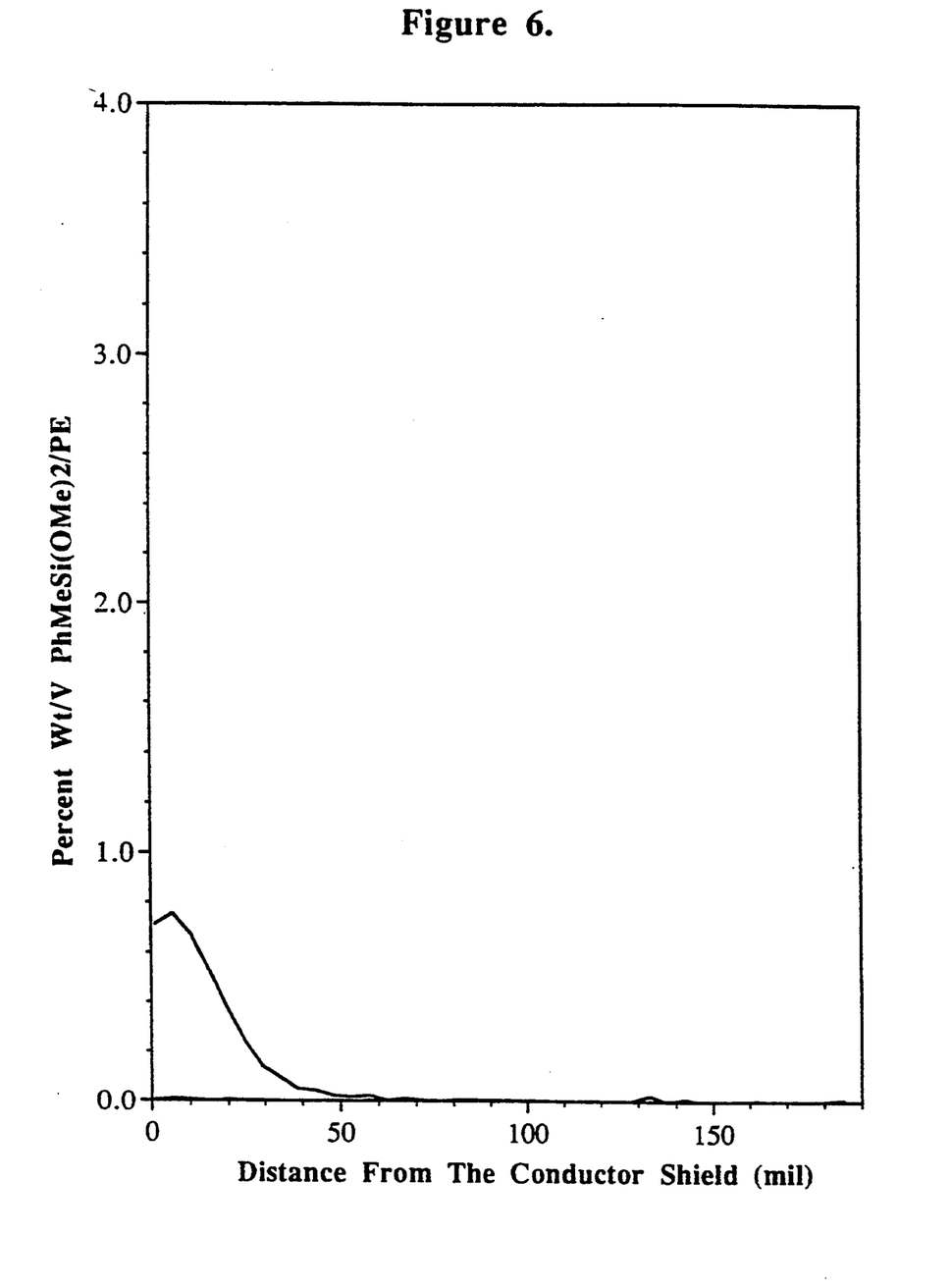
FIG. 6 is a plot of the concentration of phenylmethyldimethoxysilane in the insulation of phase 3 of the treated feeder cable of FIG. 4 as a function of distance from the conductor shield.

A feeder cable comprising three phases (each 1,000 kcmil, 15 kV-rated crosslinked polyethylene insulation, 61 strand aluminum conductor) which had been in the field for about 23 years was removed from service and treated with an antitreeing fluid of the prior art. The conductor interstitial volume was first flushed with methanol, whereupon phenylmethyldimethoxysilane was introduced and allowed to remain therein for 100 days while the cable was in service. After this treatment, each phase of the cable was subjected to dielectric breakdown testing. Each phase was also sectioned in a transverse direction at the same longitudinal location of the cable for comparison purposes. Upon visual inspection, the cross-section of each phase was observed to have an asymmetric penetration front. The above described micro mapping technique was used to scan four radial directions (i.e., at 90° increments) of each cross-section. A quantitative determination of the amount of phenylmethyldimethoxysilane at various points along each radius was made based on previous calibrations using polyethylene samples which contained known concentrations of this fluid. The results of these experiments are presented in graphical form in FIGS. 4 through 6 for phases 1 through 3, respectively. In these figures, the concentration of the fluid as a weight/volume percent (grams/cc×100) is plotted against the radial distance from the conductor shield (mils) at 0, 90, 180 and 270 degrees. The penetration of fluid in the case of phase 1 is seen to be considerably greater along each radial direction than in the case of either phase 2 or phase 3, wherein at least two of the radial scans showed essentially no penetration. The extent of this penetration and improved symmetry were found to be directly correlated with the breakdown strength of the three phases, these being 284 (phase 1), 196 (phase 2) and 202 (phase 3) volts/mil, respectively.

That which is claimed is:

1. A method for enhancing the dielectric properties of an electrical cable having a central stranded conductor encased in a polymeric insulation, the cable having an interstitial void space in the region of the conductor, said method comprising: supplying said interstitial void space with a water-reactive antitreeing agent having a diffusion coefficient of at least $1 \times 10^{-7}$ cm$^2$/second at 50° C. in said polymeric insulation, said antifreeing agent having an initial viscosity of $\leq 100$ cP at 25° C.

2. The method according to claim 1, wherein said antitreeing agent is selected from the group consisting of trialkylalkoxysilanes and dialkyldialkoxysilanes.

3. The method according to claim 1, wherein said antitreeing agent is an orthoester having the general structure R$^1$C(OCH$_3$)$_3$, where R$^1$ is selected from hydrogen or a methyl radical.

4. The method according to claim 1, wherein said antitreeing agent is an enol ether having the general structure R$^3$R$^4$C=C(OR$^5$)R$^6$, where R$^3$, R$^4$ and R$^6$ are independently selected from hydrogen or alkyl radicals having 1 to 3 carbon atoms and $R^5$ is $-SiR^7_3$, in which $R^7$ is an alkyl radical having 1 to 2 carbon atoms.

5. The method according to claim 1, wherein said antitreeing agent is an organoborate.

6. The method according to claim 2, wherein said antitreeing agent is selected from trimethylmethoxysilane or dimethyldimethoxysilane.

7. The method according to claim 3, wherein said antitreeing agent is $(MeO)_3CCH_3$, wherein Me denotes a methyl radical.

8. The method according to claim 4, wherein said antitreeing agent is $CH_2=C(Me)-OSiMe_3$, in which Me denotes a methyl radical.

9. The method according to claim 5, wherein said antitreeing agent is $(MeO)_3B$, in which Me denotes a methyl radical.

* * * * *